United States Patent [19]
Reichert et al.

[11] Patent Number: 5,837,827
[45] Date of Patent: Nov. 17, 1998

[54] FIBRE-REACTIVE DYES, THEIR PREPARATION AND THEIR USE

[75] Inventors: Hans Reichert, Rheinfelden; Herbert Klier, Efringen-Kirchen, both of Germany

[73] Assignee: Ciba Specialty Chemicals Corporation, Tarrytown, N.Y.

[21] Appl. No.: 744,161

[22] Filed: Nov. 12, 1996

[30] Foreign Application Priority Data

Nov. 16, 1995 [CH] Switzerland .............................. 3253/95

[51] Int. Cl.⁶ .......................... C09B 62/04; C09B 62/503; D06P 1/38
[52] U.S. Cl. ............................ 534/618; 534/624; 534/634
[58] Field of Search .................... 534/634, 618, 534/624

[56] References Cited

U.S. PATENT DOCUMENTS

| | | | |
|---|---|---|---|
| 4,323,497 | 4/1982 | Hoyer et al. | 534/634 |
| 4,507,236 | 3/1985 | Seiler et al. | 534/634 |
| 5,175,262 | 12/1992 | Loeffler et al. | 534/634 |
| 5,200,511 | 4/1993 | Loeffler et al. | 534/634 |
| 5,232,462 | 8/1993 | Tzikas | 8/549 |
| 5,451,665 | 9/1995 | Tzikas | 534/618 |
| 5,552,532 | 9/1996 | Klier et al. | 534/612 |

FOREIGN PATENT DOCUMENTS

| | | |
|---|---|---|
| 0478503 | 4/1992 | European Pat. Off. . |
| 0625549 | 11/1994 | European Pat. Off. . |
| 2008145 | 5/1979 | United Kingdom . |

*Primary Examiner*—Fiona T. Powers
*Attorney, Agent, or Firm*—David R. Crichton

[57] ABSTRACT

Compounds of the formula

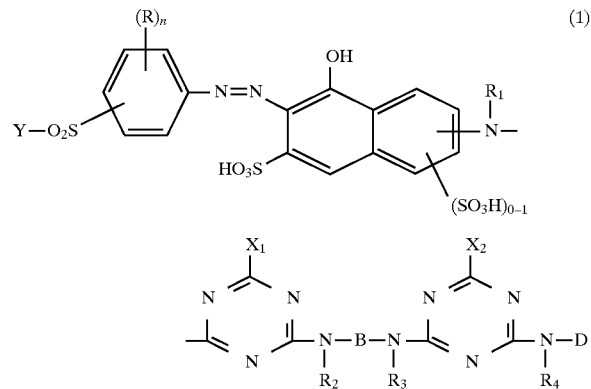

in which the variables have the meaning given in the claims, which are suitable as fibre-reactive dyes for dyeing or printing widely varying fibre materials are described.

12 Claims, No Drawings

FIBRE-REACTIVE DYES, THEIR PREPARATION AND THEIR USE

The present invention relates to novel reactive dyes, processes for their preparation and their use for dyeing or printing textile fibre materials.

The practice of dyeing using reactive dyes has recently led to increased demands on the quality of the dyeings and the profitability of the dyeing process. Consequently, there is still a need for novel reactive dyes which have improved properties, in particular in respect of application.

Reactive dyes which have an adequate substantivity and at the same time show a good ease of washing off of the unfixed portions are now required for dyeing. They should furthermore show a good dyeing yield and have a high reactivity, and in particular dyeings should be produced with high degrees of fixing. The known dyes do not meet these requirements in all their properties.

The present invention is therefore based on the object of discovering novel, improved reactive dyes for dyeing and printing fibre materials which have the qualities characterized above to a high degree. In particular, the novel dyes should be distinguished by high fixing yields and high fibre-dye bond stabilities, and furthermore the portions not fixed on the fibre should be easy to wash off. They should furthermore produce dyeings with good all-round properties, for example light and wet fastness properties.

It has been found that the object described is largely achieved with the novel reactive dyes defined below.

The present invention therefore relates to compounds of the formula

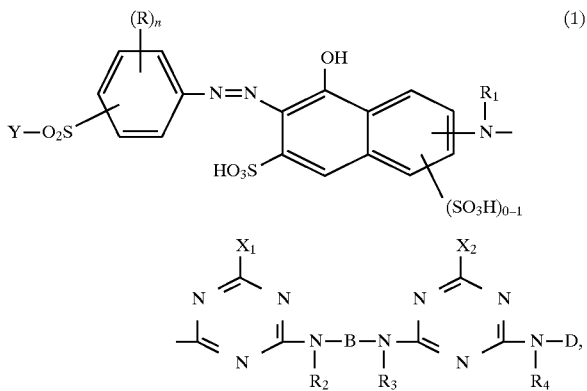

in which B is an aliphatic bridge member,
D is the radical of a monoazo, polyazo, metal complex azo, anthraquinone, phthalocyanine, formazan or dioxazine chromophore,
$(R)_n$ is n identical or different radicals from the group consisting of $C_1$–$C_4$alkyl, $C_1$–$C_4$alkoxy, halogen and sulfo,
n is the number 0, 1 or 2,
$R_1$, $R_2$, $R_3$ and $R_4$ independently of one another are each hydrogen or substituted or unsubstituted $C_1$–$C_4$alkyl,
one of the radicals $X_1$ and $X_2$ is chlorine and the other is fluorine,
Y is vinyl or a radical —$CH_2$—$CH_2$—U and
U is a leaving group.

The compounds of the formula (1) contain at least one, preferably at least two, and particularly preferably 2 to 8, sulfo groups, each of which is present either in the form of its free acid or, preferably, as salts thereof. Salts are, for example, the alkali metal, alkaline earth metal or ammonium salts, salts of an organic amine or mixtures thereof. Examples are sodium, lithium, potassium or ammonium salts, the salt of mono-, di- or triethanolamine or Na/Li or Na/Li/$NH_4$ mixed salts.

An aliphatic bridge member B is, for example, straight-chain or branched $C_2$–$C_{12}$alkylene which is unsubstituted or substituted by hydroxyl, $C_1$–$C_4$alkoxy, sulfato or sulfo and/or interrupted once or several times by —O— or —$NR_5$—, in which $R_5$ is hydrogen or $C_1$–$C_4$alkyl, preferably hydrogen, methyl or ethyl, and particularly preferably hydrogen. B is preferably straight-chain or branched $C_2$–$C_6$alkylene which is unsubstituted or substituted by hydroxyl, sulfo or sulfato, and particularly preferably unsubstituted straight-chain or branched $C_2$–$C_6$alkylene. Examples of particularly preferred radicals B are 1,2-ethylene, 1,3-propylene, 2-hydroxy-1, 3-propylene, 1,4-butylene, 2-methyl-1,5-pentylene, 1, 6-hexylene and, in particular, 1,2-propylene.

Substituted or unsubstituted $C_1$–$C_4$alkyl $R_1$, $R_2$, $R_3$ or $R_4$ can be, for example, methyl, ethyl, n- or iso-propyl or n-, sec-, tert- or iso-butyl which are unsubstituted or substituted, for example by hydroxyl, sulfo, sulfato, carboxyl, cyano, halogen, $C_1$–$C_4$alkoxycarbonyl or carbamoyl.

$R_1$, $R_2$, $R_3$ or $R_4$ independently of one another are each preferably hydrogen or $C_1$–$C_4$alkyl, particularly preferably hydrogen, methyl or ethyl, and especially preferably hydrogen.

R is preferably methyl, methoxy, chlorine or sulfo, and particularly preferably sulfo.

n is preferably the number 0 or 1, and particularly preferably the number 0.

$(R)n$ is preferably 0, 1 or 2 identical or different radicals R from the group consisting of methyl, methoxy, chlorine and sulfo, and particularly preferably 0 or 1 radical from the group consisting of methyl, methoxy, chlorine and sulfo.

$X_1$ is preferably chlorine and $X_2$ is preferably fluorine.

Y is a radical —$CH_2$—$CH_2$—U, the leaving group U can be, for example, —Cl, —Br, —F, —$OSO_3H$, —$SSO_3H$, —OCO—$CH_3$, —$OPO_3H_2$, —OCO—$C_6H_5$, —$OSO_2$—$C_1$–$C_4$alkyl or —$OSO_2$—$N(C_1$–$C_4$alkyl$)_2$. U is preferably a group of the formula —Cl, —$OSO_3H$, —$SSO_3H$, —OCO—$CH_3$, —OCO—$C_6H_5$ or —$OPO_3H_2$, in particular —Cl or —$OSO_3H$, and particularly preferably —$OSO_3H$.

Y is preferably vinyl, β-chloroethyl, , β-sulfatoethyl, β-thiosulfatoethyl, ,β-acetoxyethyl, β-phenoxyethyl or β-phosphatoethyl, and particularly preferably β-sulfatoethyl or vinyl.

D is preferably the radical of a monoazo, disazo, anthraquinone, formazan, phthalocyanine or dioxazine chromophore, and particularly preferably the radical of a monoazo, disazo or formazan chromophore.

The radical D can contain substituents customary in dyes on its base skeleton. Examples of such substituents are: $C_1$–$C_{12}$alkyl, in particular $C_1$–$C_4$alkyl, which generally comprises methyl, ethyl, n- or iso-propyl or n-, iso-, sec- or tert-butyl, $C_1$–$C_8$alkoxy, in particular $C_1$–$C_4$alkoxy, which is to be understood as meaning generally methoxy, ethoxy, n- or iso-propoxy or n-, iso-, sec- or tert-butoxy, $C_1$–$C_4$alkoxy which is substituted in the alkyl moiety, for example by hydroxyl, $C_1$–$C_4$alkoxy or sulfato, for example 2-hydroxyethoxy, 3-hydroxypropoxy, 2-sulfatoethoxy, 2-methoxyethoxy or 2-ethoxyethoxy, acylamino groups having 2 to 8 carbon atoms, in particular $C_2$–$C_4$alkanoylamino groups, such as acetylamino or propionylamino, benzoylamino or $C_2$–$C_4$alkoxycarbonylamino groups, such as methoxycarbonylamino or ethoxycarbonylamino, amino, N-mono- or N,N-di-$C_1$–$C_4$alkylamino which is unsubstituted or substituted in the alkyl moiety, for example by hydroxyl, sulfo, sulfato or C₁–C₄alkoxy, for example methylamino, ethylamino, N,N-dimethyl- or N,N-diethylamino, sulfomethylamino, β-hydroxyethylamino, N,N-di-(β-hydroxyethylamino), or N-β-sulfatoethyl-amino, phenyl amino which is unsubstituted or substituted in the phenyl moiety by methyl, methoxy, halogen or sulfo, N-C₁–C₄alkyl-N-phenylamino which is unsubstituted or substituted in the alkyl moiety by hydroxyl, sulfo or sulfato or unsubstituted or substituted in the methyl moiety by methyl, methoxy, halogen or sulfo, for example N-methyl-N-phenylamino, N-ethyl-N-phenylamino, N-β-hydroxyethyl-N-phenylamino or N-β-sulfoethyl-N-phenylamino, naphthylamino which is unsubstituted or substituted by sulfo, alkanoyl groups having 2 to 8 carbon atoms, in particular 2 to 4 carbon atoms, for example acetyl or propionyl, benzoyl, C₁–C₄alkoxycarbonyl, which generally comprises, for example, methoxycarbonyl or ethoxycarbonyl, C₁–C₄alkylsulfonyl, such as methylsulfonyl or ethylsulfonyl, phenyl- or naphthylsulfonyl, trifluoromethyl, nitro, cyano, hydroxyl, halogen, which generally comprises fluorine, bromine or, in particular, chlorine, carbamoyl, N-C₁–C₄alkylcarbamoyl, such as N-methylcarbamoyl or N-ethylcarbamoyl, sulfamoyl, N-C₁–C₄alkylsulfamoyl, such as N-methylsulfamoyl, N-ethylsulfamoyl, N-propylsulfamoyl, N-isopropylsulfamoyl or N-butylsulfamoyl, N-(β-hydroxyethyl)-sulfamoyl, N,N-di-(β-hydroxyethyl)-sulfamoyl, N-phenylsulfamoyl, ureido, carboxyl, sulfomethyl, sulfo or sulfato. The alkyl radicals can also be interrupted by oxygen (—O—).

Examples of suitable chromophore radicals D are:

(i) 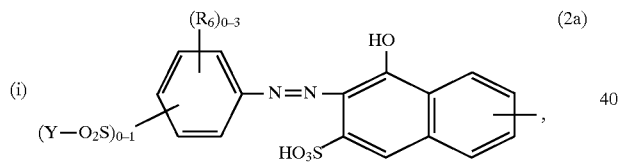 (2a)

in which $(R_6)_{0-3}$ is 0 to 3 identical or different substituents from the group consisting of C₁–C₄alkyl, C₁–C₄alkoxy, halogen, carboxyl and sulfo and Y is as defined above;

(ii) 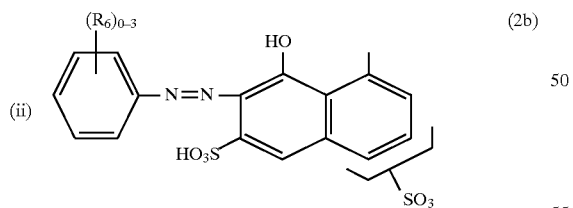 (2b)

in which $(R_6)_{0-3}$ is as defined above;

(iii) 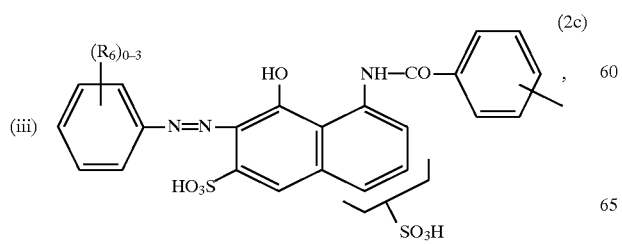 (2c)

in which $(R_6)_{0-3}$ is as defined above;

(iv) 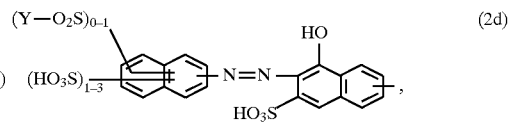 (2d)

in which Y is as defined above;

(v) 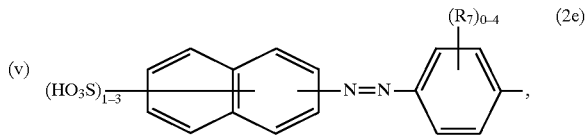 (2e)

in which $(R_7)_{0-4}$ is 0 to 4 identical or different substituents from the group consisting of halogen, nitro, cyano, trifluoromethyl, sulfamoyl, carbamoyl, C₁–C₄alkyl, C₁–C₄alkoxy, amino, acetylamino, ureido, hydroxyl, carboxyl, sulfomethyl and sulfo;

(vi) 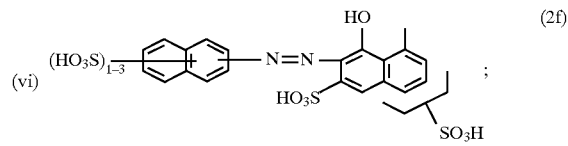 (2f)

(vii) 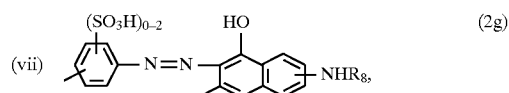 (2g)

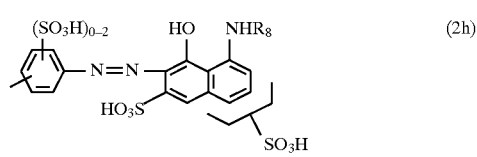 (2h)

or

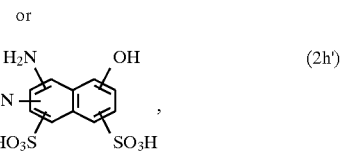 (2h')

which R₈ is C₁–C₄alkanoyl, benzoyl or a non-reactive triazinyl radical of the formula

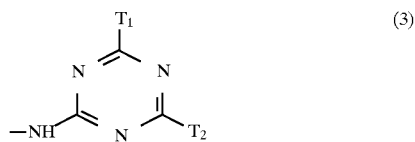 (3)

and in which T₁ and T₂ independently of one another are each hydroxyl, C₁–C₄alkoxy, C₁–C₄alkylthio, morpholino or amino which is unsubstituted or substituted by non-reactive radicals; examples of non-reactive radicals T₁ or T₂ here are amino; N-C₁–C₄alkylamino or N,N-di-C₁–C₄alkylamino, in which the alkyl can in each case be substituted, for example by sulfo, sulfato, hydroxyl, carboxyl or phenyl; cyclohexylamino; phenylamino or naphthylamino, in which the phenyl or naphthyl can in each case be substituted, for example by C₁–C₄alkyl, C₁–C₄alkoxy, amino, C₂–C₄alkanoylamino, carboxyl, sulfo or halogen; or N-C₁–C₄alkyl-N-phenylamino, in which the alkyl and phenyl can be unsubstituted or substituted as described above; and in particular amino, methylamino, ethylamino, β-hydroxyethylamino, N,N-di-β-hydroxyethylamino, β-sulfoethylamino, cyclohexylamino, o-, m- or p-methylphenylamino, o-, m- or p-methoxyphenylamino, o-, m- or p-sulfophenylamino, 2,4- or 2,5-disulfophenylamino, 2- or 3-sulfo-4-methoxyphenylamino, 2- or 3-sulfo-4-methylphenylamino, 4-methyl-2,5-disulfophenylamino, o-carboxyphenylamino, 1- or 2-naphthylamino, 1-sulfo-2-naphthylamino, 1,5-disulfo-2-naphthylamino, 6,8-disulfo-2-naphthylamino, 4,8-disulfo-2-naphthylamino, 4,6,8-trisulfo-2-naphthylamino, 1,5,7-trisulfo-2-naphthylamino, 3,6,8-trisulfo-2-naphthylamino, 1,6-disulfo-2-naphthylamino, N-ethyl-N-phenylamino, N-methyl-N-phenylamino, N-β-sulfoethyl-N-phenylamino, or β-hydroxyethyl-N-phenylamino;

(viii)

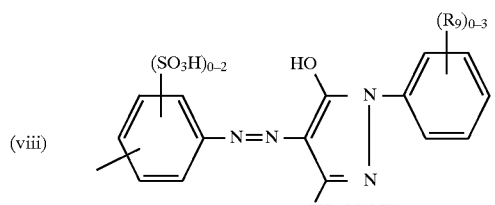

or

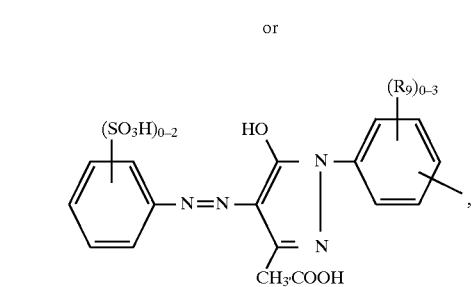

in which $(R_9)_{0-3}$ is 0 to 3 identical or different substituents from the group consisting of $C_1$–$C_4$alkyl, $C_1$–$C_4$alkoxy, halogen, carboxyl and sulfo;

(ix)

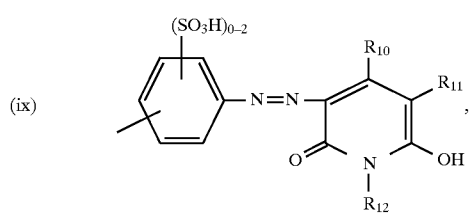

in which $R_{10}$ and $R_{12}$ independently of one another are hydrogen, $C_1$–$C_4$alkyl or phenyl and $R_{11}$ is hydrogen, cyano, carbamoyl or sulfomethyl;

(x)

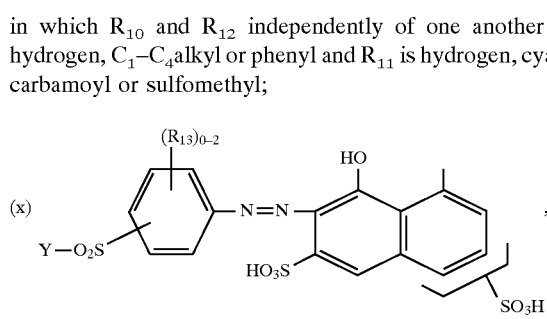

in which $(R_{13})_{0-2}$ is 0 to 2 identical or different substituents from the group consisting of $C_1$–$C_4$alkyl, $C_1$–$C_4$alkoxy, halogen, carboxyl and sulfo; and Y is as defined above;

(xi)

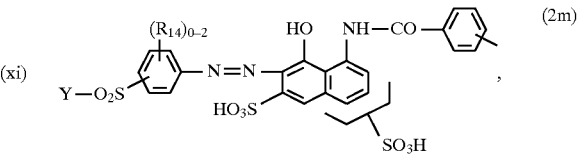

in which $(R_{14})_{0-2}$ is 0 to 2 identical or different substituents from the group consisting of $C_1$–$C_4$alkyl, $C_1$–$C_4$alkoxy, halogen, carboxyl and sulfo; and Y is as defined above;

(xii)

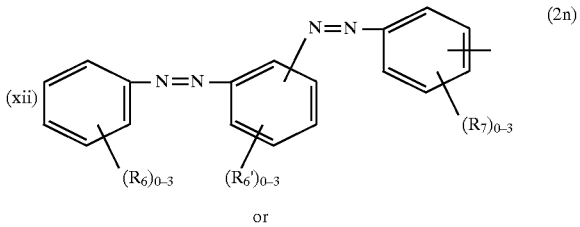

or

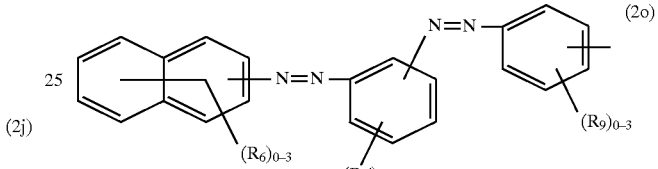

or

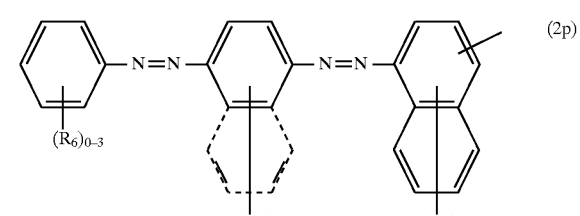

or

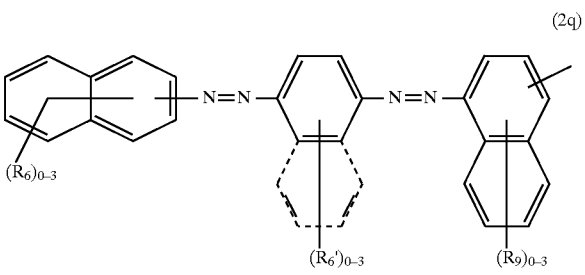

or

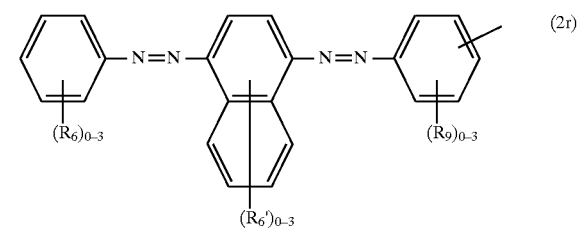

in which $(R_6)_{0-3}$, $(R_7)_{0-3}$ and $(R_9)_{0-3}$ are each as defined above and $(R_6')_{0-3}$ is 0 to 3 identical or different substituents from the group consisting of $C_1$–$C_4$alkyl, $C_1$–$C_4$alkoxy which is unsubstituted or substituted by hydroxyl, sulfato or $C_1$–$C_2$alkoxy, halogen, carboxyl or sulfo;

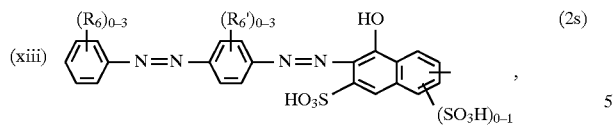

(xiii)

in which $(R_6)_{0-3}$ and $(R_6')_{0-3}$ are each as defined above;

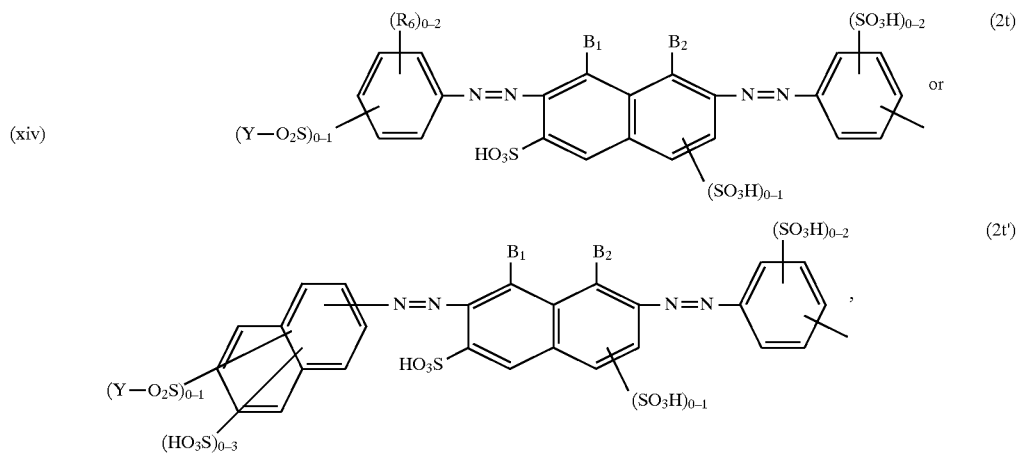

(xiv)

in which $(R_6)_{0-2}$ is 0 to 2 identical or different substituents from the group consisting of $C_1$–$C_4$alkyl, $C_1$–$C_4$alkoxy, halogen, carboxyl and sulfo, one of the variables $B_1$ and $B_2$ is hydroxyl and the other is amino and Y is as defined above;

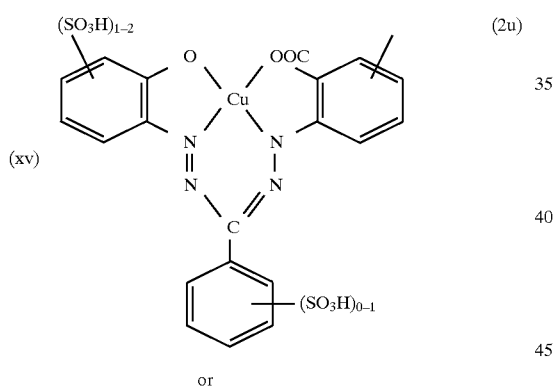

(xv)

or

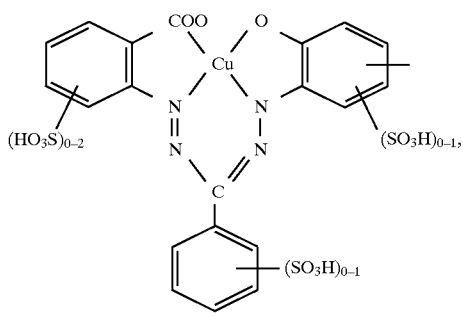

(xvi)

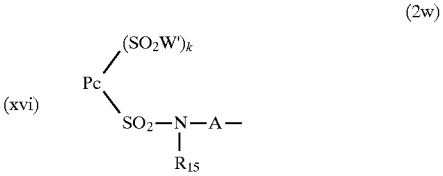

in which the benzene nuclei contain no further substituents or are further substituted by $C_1$–$C_4$alkyl, $C_1$–$C_4$alkoxy, $C_1$–$C_4$alkylsulfonyl, halogen or carboxyl;

in which Pc is the radical of a metal phthalocyanine, in particular the radical of a copper or nickel phthalocyanine;

W' is —OH and/or —$NR_{16}R_{16}'$;

$R_{16}$ and $R_{16}'$ independently of one another are hydrogen or $C_1$–$C_4$alkyl which is unsubstituted or substituted by hydroxyl or sulfo;

$R_{15}$ is hydrogen or $C_1$–$C_4$alkyl;

A is a phenylene radical which is unsubstituted or substituted by $C_1$–$C_4$alkyl, halogen, carboxyl or sulfo or is a $C_2$–$C_6$alkylene radical; and k is 1 to 3;

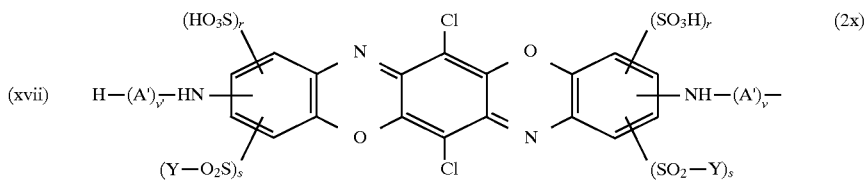

(2x)

in which A' is a phenylene radical which is unsubstituted or substituted by $C_1$–$C_4$alkyl, halogen, carboxyl or sulfo or is a $C_2$–$C_6$alkylene radical, r, s, v and v' independently of one another are each the number 0 or 1 and Y is as defined above; and

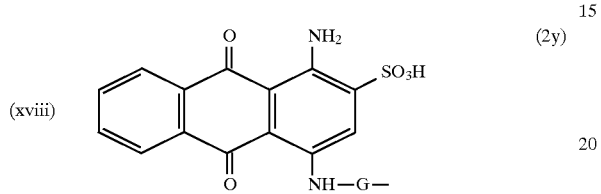

(2y)

in which G is a phenylene radical which is unsubstituted or substituted by $C_1$–$C_4$alkyl, $C_1$–$C_4$alkoxy, halogen, carboxyl or sulfo or is a cyclohexylene, phenylenemethylene or $C_2$–$C_6$alkylene radical.

D is particularly preferably a radical of the formula (2a), (2e), (2h), (2h'), (2k), (2s) or (2v) defined above.

A preferred embodiment of the present invention relates to compounds of the formula in which R' is hydrogen, methyl, methoxy, chlorine or sulfo, Y is vinyl or β-sulfatoethyl, $R_1$, $R_2$, $R_3$ and $R_4$ independently of one another are each hydrogen or $C_1$–$C_4$alkyl, one of the radicals $X_1$ and $X_2$ is chlorine and the other is fluorine, B is straight-chain or branched $C_2$–$C_6$alkylene and D is a radical of the formula (2a), (2e), (2h), (2h'), (2k), (2s) or (2v) defined above.

A particularly preferred embodiment of the present invention relates to compounds of the formula (1a) defined above, in which R' is hydrogen or sulfo Y is vinyl or β-sulfatoethyl, $R_1$, $R_2$, $R_3$ and $R_4$ are each hydrogen, $X_1$ is chlorine and $X_2$ is fluorine, B is straight-chain or branched $C_2$–C6alkylene and D is a radical of the formula

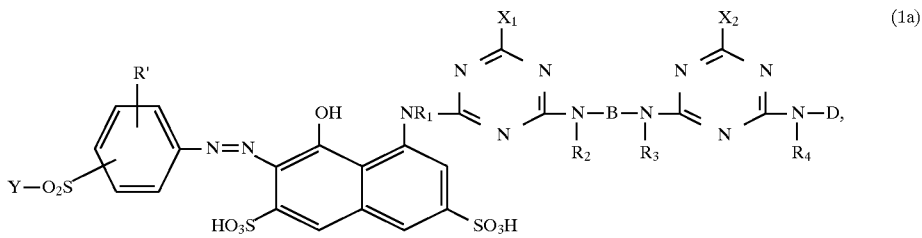

(1a)

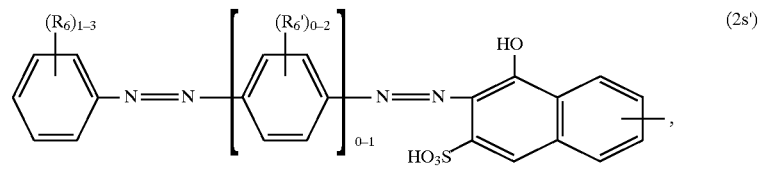

(2s')

(2e')

or

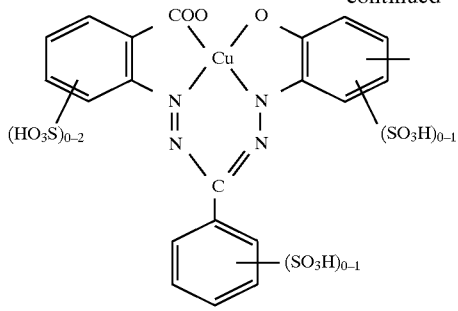

(2v)

in which $(R_6)_{1-3}$ is 1 to 3 identical or different radicals from the group consisting of methyl, methoxy and sulfo, $(R_6')_{0-2}$ is 0 to 2 identical or different radicals from the group consisting of sulfo, methyl and methoxy, $R_7$ is methyl, methoxy, acetylamino, ureido or sulfo and K is a 1- or 2-naphthyl radical which is substituted by sulfo, amino, hydroxyl, benzoylamino or by a radical of the formula

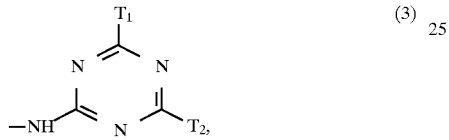

(3)

in which $T_1$ and $T_2$ independently of one another are each morpholino, amino, methylamino, ethylamino, β-hydroxyethylamino, N,N-di-β-hydroxyethylamino, β-sulfoethylamino, cyclohexylamino, o-, m- or p-methylphenylamino, o-, m- or p-methoxyphenylamino, o-, m- or p-sulfophenylamino, 2,4- or 2,5-disulfophenylamino, 2- or 3-sulfo-4-methoxyphenylamino, 2- or 3-sulfo-4-methylphenylamino, 4-methyl-2,5-disulfophenylamino, o-carboxyphenylamino, 1- or 2-naphthylamino, 1-sulfo-2-naphthylamino, 1,5-disulfo-2-naphthylamino, 6,8-disulfo-2-naphthylamino, 4,8-disulfo-2-naphthylamino, 4,6,8-trisulfo-2-naphthylamino, 1,5,7-trisulfo-2-naphthylamino, 3,6,8-trisulfo-2-naphthylamino, 1,6-disulfo-2-naphthylamino, N-ethyl-N-phenylamino, N-methyl-N-phenylamino, N-β-sulfoethyl-N-phenylamino, or β-hydroxyethyl-N-phenylamino, or is a pyridone radical of the formula

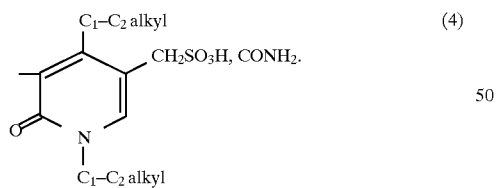

(4)

An especially preferred embodiment of the present invention relates to compounds of the formula in which R' is hydrogen, methyl, methoxy, chlorine or sulfo, $(R_6)_{0-3}$ is 0 to 3 identical or different substituents from the group consisting of $C_1$–$C_4$alkyl, $C_1$–$C_4$alkoxy, halogen, carboxyl and sulfo, Y is vinyl or β-sulfatoethyl and B is straight-chain or branched $C_2$–$C_6$alkylene.

R' here is preferably hydrogen. Substituents $R_6$ are, in particular, methyl, methoxy and sulfo, in particular methoxy and sulfo. B is preferably $C_2$–$C_4$alkylene, in particular propylene, and preferably 1,2-propylene.

The present invention furthermore relates to a process for the preparation of the compounds of the formula (1) or (1a), which comprises reacting in each case about 1 molar equivalent of a compound of the formula

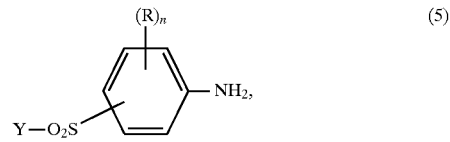

(5)

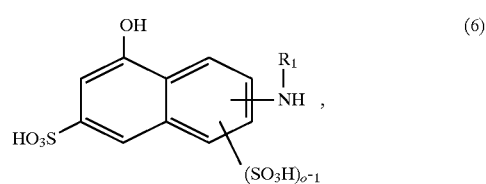

(6)

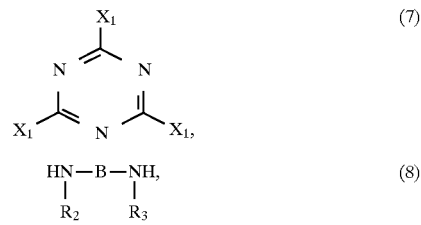

(7)

$$HN-B-NH,$$
$$\;\;\;|\quad\quad\;\;|$$
$$\;\;R_2\quad\;\;R_3$$

(8)

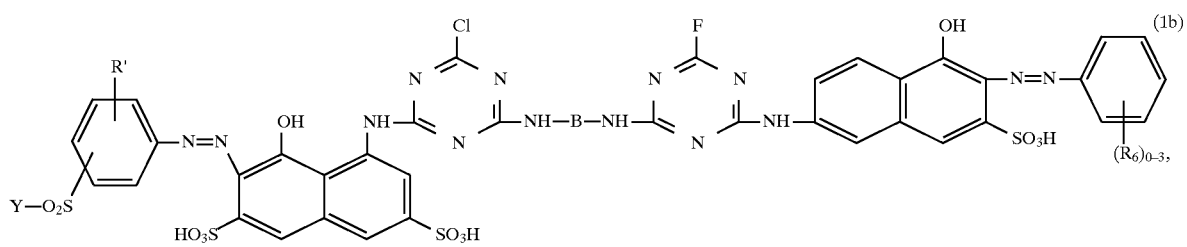

(1b)

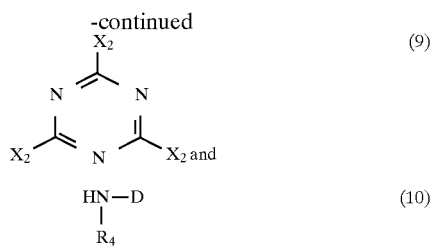

in which B, D, $(R)_n$, $R_1$, $R_2$, $R_3$, $R_4$, $X_1$, $X_2$ and Y are each as defined above, with one another in any sequence.

The diazotization of the compound of the formula (5) and its coupling with the compound of the formula (6) or a reaction product of the compounds of the formulae (6), (7) and, if appropriate, (8), (9) and (10) are carried out in the customary manner, for example by diazotizing the compound of the formula (5) in mineral acid solution, for example hydrochloric acid solution, with a nitrite, for example sodium nitrite, at a low temperature, for example at 0° to 5° C., and then carrying out the coupling with the corresponding coupling component at a neutral to slightly acid pH, for example at pH 3 to 7, and preferably 5 to 6.5, and low temperatures, for example 0° to 30° C.

The condensation reactions between the compounds of the formulae (6), (7), (8), (9) and (10) are in general carried out analogously to known processes, as a rule in aqueous solution at temperatures of, for example, 0° to 50° C. and a pH of, for example, 4 to 10. If, for example, D is the radical of a monoazo or polyazo chromophore, instead of the compound of the formula (10), an intermediate, for example a diazo component or coupling component, can also be employed in the process and the radical D can be produced only during the subsequent course of the process, by an appropriate diazotization and coupling reaction. The most important process variants are described in the examples.

The compounds of the formulae (5), (6), (7), (8), (9) and (10) are known or can be prepared analogously to known compounds.

The dyes according to the invention are fibre-reactive. Fibre-reactive compounds are to be understood as those which are capable of reacting with the hydroxyl groups of cellulose, the amino, carboxyl, hydroxyl or thiol groups of wool end silk, or with the amino and, where appropriate, with the carboxyl groups of synthetic polyamides to form covalent chemical bonds.

The dyes according to the invention are suitable for dyeing and printing widely varying materials, such as fibre materials containing hydroxyl groups or containing nitrogen. Examples are silk, leather, wool, polyamide fibres and polyurethanes, and in particular all types of cellulosic fibre materials. Such cellulosic fibre materials are, for example, the natural cellulosic fibres, such as cotton, linen and hemp, as well as cellulose and regenerated cellulose. The dyes according to the invention are also suitable for dyeing or printing fibres containing hydroxyl groups which are contained in blend fabrics, for example mixtures of cotton with polyester fibres or polyamide fibres. The dye mixtures according to the invention and the dyes according to the invention are particularly suitable for dyeing or printing cellulosic fibre materials. They can furthermore be used for dyeing or printing natural or synthetic polyamide fibre materials.

The dyes according to the invention can be applied to the fibre material and fixed on the fibre in various ways, in particular in the form of aqueous dye solutions and printing pastes. They are suitable both for the exhaust method and for dyeing by the pad-dyeing method, in which the goods are impregnated with aqueous dye solutions, which may contain salts, and, after treatment with alkali or in the presence of alkali, the dyes are fixed, if appropriate under the action of heat or by storage at room temperature for several hours. After the fixing, the dyeings or prints are rinsed thoroughly with cold and hot water, if appropriate with the addition of an agent which has a dispersing action and promotes diffusion of the non-fixed portions.

The dyes according to the invention are distinguished by a high reactivity, good fixing capacity and very good build-up capacity. They can therefore be employed by the exhaust dyeing method at low dyeing temperatures and require only short steaming times in the pad-steam method. The degrees of fixing are high and the non-fixed portions can easily be washed out, the difference betweeen the degree of exhaustion and degree of fixing being remarkably small, i.e. the soaping loss being very low. The dyes according to the invention and, in particular, the dye mixtures according to the invention are also particularly suitable for printing, in particular on cotton, but also for printing nitrogen-containing fibres, for example wool or silk, or blend fabrics which comprise wool or silk.

The dyeings and prints produced with the dyes according to the invention have a high colour strength and a high fibre-dye bond stability both in the acid and in the alkaline range, and furthermore a good fastness to light and very good wet fastness properties, such as fastness to washing, water, seawater, crossdyeing and perspiration, as well as a good fastness to pleating, fastness to ironing and fastness to rubbing.

The following examples serve to illustrate the invention. Temperatures are stated in degrees Celsius, parts are parts by weight and the percentage data are based on percentages by weight, unless noted otherwise. Parts by weight bear the same relation to parts by volume as the kilogram to the liter.

EXAMPLE 1

Preparation of the compound of the formula

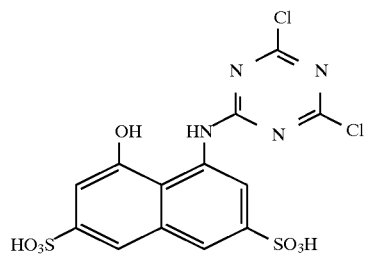

19 parts of cyanuric chloride and 5 parts of disodium hydrogen phosphate are thoroughly mixed vigorously in 50 parts of ice/water, with the addition of a wetting agent, at a temperature of 0° C. for 15 minutes. A neutral soluticn of 32 parts of 1-amino-8-naphthol-3,6-disulfonic acid in 300 parts of water is added dropwise such that the reaction mixture does not exceed a pH of 3. When the addition has ended, the mixture is kept at pH 3 and 0° C. with sodium hydroxide solution for a further two hours.

EXAMPLE 2

Diazotization of 2-(4-aminophenylsulfonyl)ethyl hydrogen sulfate. 28 parts of 2-(4-aminophenylsulfonyl)ethyl hydrogen sulfate are suspended in 300 parts of water and dissolved at pH 6 with saturated sodium carbonate solution, the solution is cooled to 0° C., 7 parts of sodium nitrite, 50 parts of ice and 30 parts of concentrated hydrochloric acid are added and diazotization is carried out for two hours. Thereafter, excess nitrite is destroyed with a little sulfamic acid.

EXAMPLE 3

Preparation of the compound of the formula

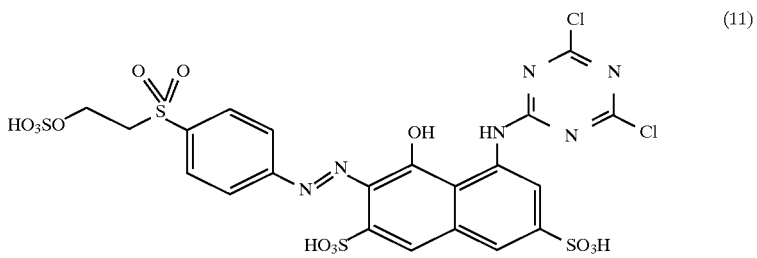
(11)

The reaction mixture prepared according to Example 2 is added to the reaction mixture prepared according to Example 1 in the course of about 30 minutes, and the pH is raised to 4.5 in the course of three hours with saturated sodium acetate solution and the temperature is kept between 0° and 5° C.

EXAMPLE 4

Preparation of the compound of the formula

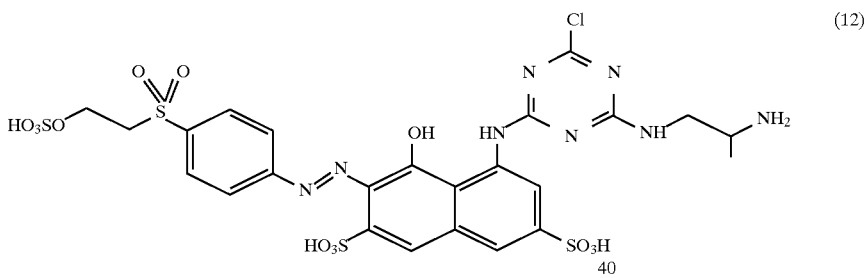
(12)

A solution, neutralized with hydrochloric acid, of 15 parts of 1,2-diaminopropane in 150 parts of water is added to the reaction mixture prepared according to Example 3, and the pH is kept at 5 with 4N sodium hydroxide solution and the mixture is allowed to warm to room temperature. When the reaction has ended, the reaction product is precipitated by addition of potassium chloride, filtered off, washed with saturated potassium chloride solution and dried in vacuo at 40° C.

EXAMPLE 4a

The procedure described in Example 4 is followed, except that 12 parts of 1,2-diaminoethane are used instead of 15 parts of 1,2-diaminopropane, affording a compound of the formula

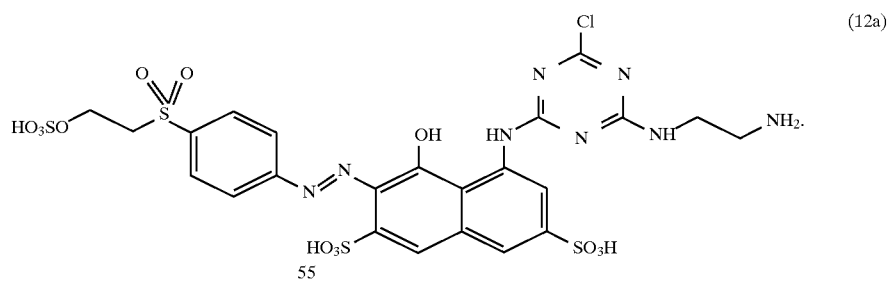
(12a)

EXAMPLE 4b

The procedure described in Example 4 is followed, except that 30 parts of 1,3-diaminopropane are used instead of 15 parts of 1,2-diaminopropane, affording a compound of the formula

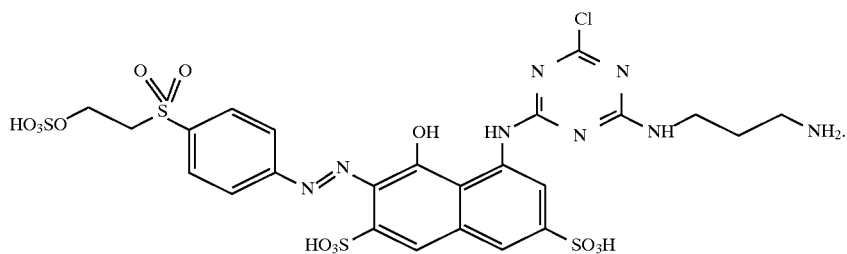

(12b)

EXAMPLE 4c

The procedure described in Examples 4 is followed, except that 120 parts of 1,6-diaminopropane are used instead of 15 parts of 1,2-diaminopropane, affording a compound of the formula

EXAMPLE 5a

The procedure described in Example 5 is followed, except that 78 parts of the compound of the formula (12a) are used instead of 80 parts of the compound of the formula (12), affording the dye of the formula

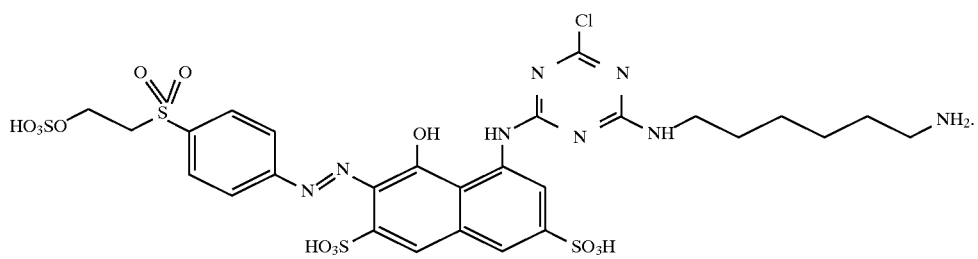

(12c)

EXAMPLE 5

14 parts of cyanuric fluoride are added dropwise to a neutral solution of 55 parts of 3-(4-amino-2-ureido-phenylazo)naphthalene-2,5,7-trisulfonic acid and 5 parts of disodium hydrogen phosphate in 500 parts of water at a temperature of 0° to 2° C. The pH is kept constant at 5.5 here by addition of aqueous sodium hydroxide solution. When the reaction has ended, a suspension of 80 parts of the compound of the formula (12) prepared according to Example 4 in 400 parts of water is added to this reaction mixture, the pH is raised to and kept at 8.5 with sodium hydroxide solution and the temperature is increased to room temperature. When the condensation has ended, the temperature is increased to 30° C. and the pH is raised to 11 and kept at 11 for 20 minutes by addition of sodium hydroxide solution. The pH is lowered to 7 with concentrated hydrochloric acid and the reaction mixture is allowed to cool to room temperature, largely desalinated by reverse osmosis and evaporated in vacuo. The dye of the formula

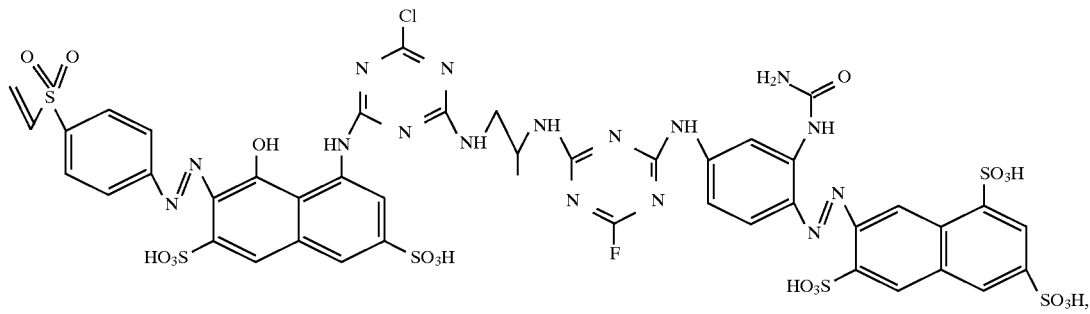

which dyes cellulose in orange-coloured shades with good all-round properties, is obained.

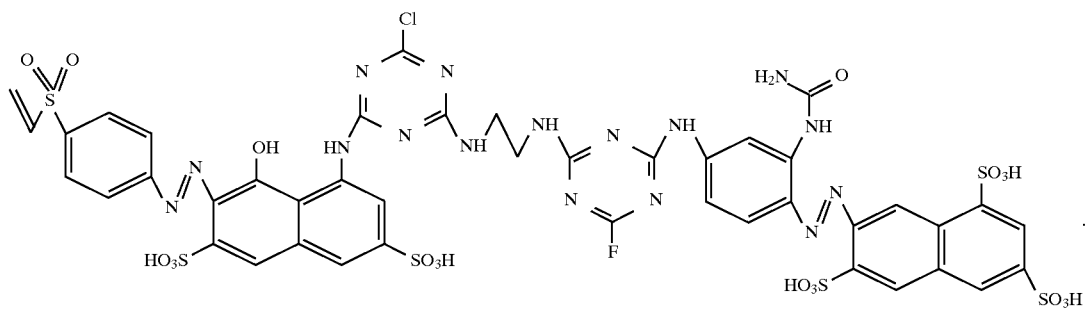

EXAMPLE 5b

The procedure described in Example 5 is followed, except that 80 parts of the compound of the formula (12b) are used instead of 80 parts of the compound of the formula (12), affording the dye of the formula ylazo)benzenesulfonic acid is used instead of 3-(4-amino-2-ureido-phenylazo)naphthalene-2,5,7-trisulfonic acid, affording the dye of the formula

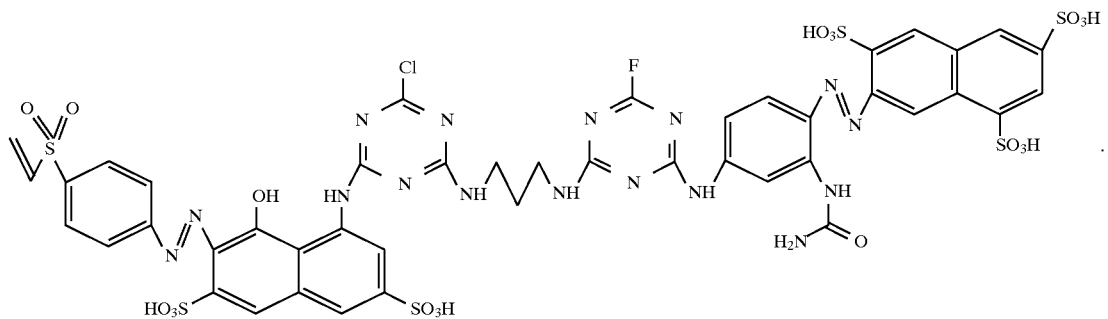

EXAMPLE 5c

The procedure described in Example 5 is followed, except that 84 parts of the compound of the formula (12c) are used instead of 80 parts of the compound of the formula (12), affording the dye of the formula

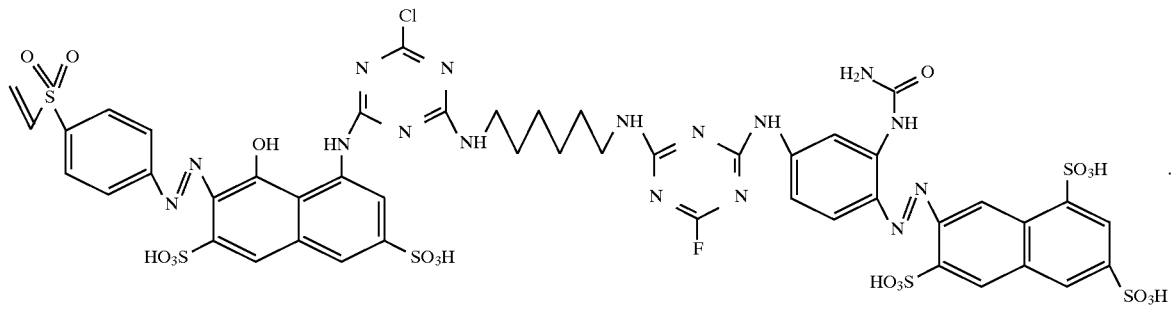

EXAMPLE 6

The procedure described in Example 5 is followed, except that an equivalent amount of 4-amino-2-(5-sulfomethylene-1-ethyl-2-hydroxy-4-methyl-6-oxo-1,6-dihydropryridin-3-

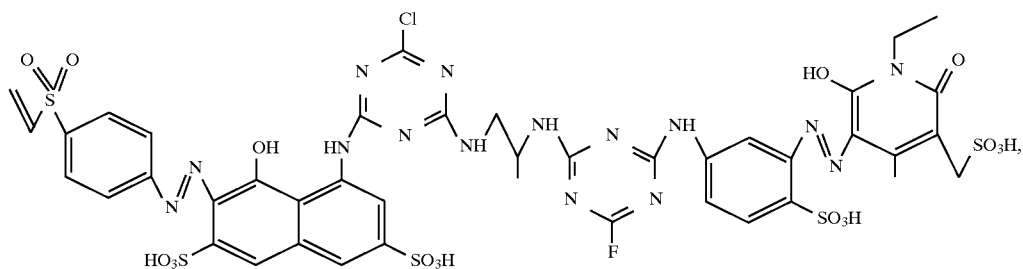

which dyes cellulose in brilliant orange-coloured shades with good all-round properties.

EXAMPLE 7

The procedure described in Example 5 is followed, except that an equivalent amount of the copper complex of 5-amino-3-(3-phenyl-5-(2-carboxy-5-sulfophenyl) -1-formazano)-4-hydroxybenzenesulfonic acid is used instead of 3-(4-amino-2-ureido-phenylazo)naphthalene-2,5, 7-trisulfonic acid, affording the compound of the formula temperature of 0° to 2° C. and the pH is kept at 6 with the aid of aqueous sodium hydroxide solution. 80 parts of the compound of the formula (12) prepared according to Example 4 are added to this reaction mixture and the pH is kept at 8.5 with dilute sodium hydroxide solution for two hours. The mixture is heated to an internal temperature of 30° C. and the pH is increased to 11 for 20 minutes. The reaction mixture is neutralized, largely desalinated by reverse osmosis and evaporated in vacuo. The dye of the formula:

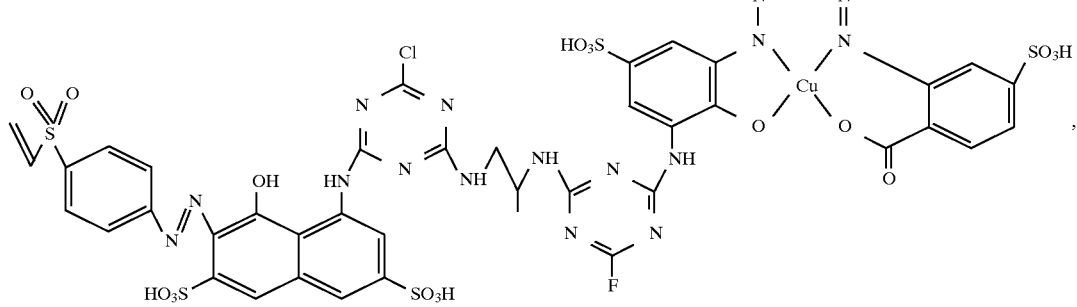

which dyes cellulose in a violet-coloured shade with good all-round properties.

EXAMPLE 8

50 parts of 7-amino-4-hydroxy-3-(4-methoxy-2-sulfophenylazo)naphthalene-2-sulfonic acid are suspended with 5 parts of disodium hydrogen phosphate in 750 parts of water, 16 parts of cyanuric fluoride are added dropwise at a

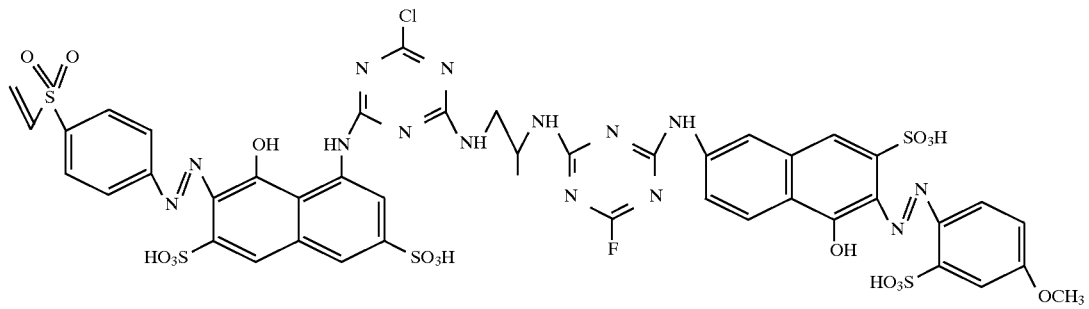

is obtained.

EXAMPLE 8a

The procedure described in Example 8 is followed, except that 78 parts of the compound of the formula (12a) are used instead of 80 parts of the compound of the formula (12), affording the dye of the formula

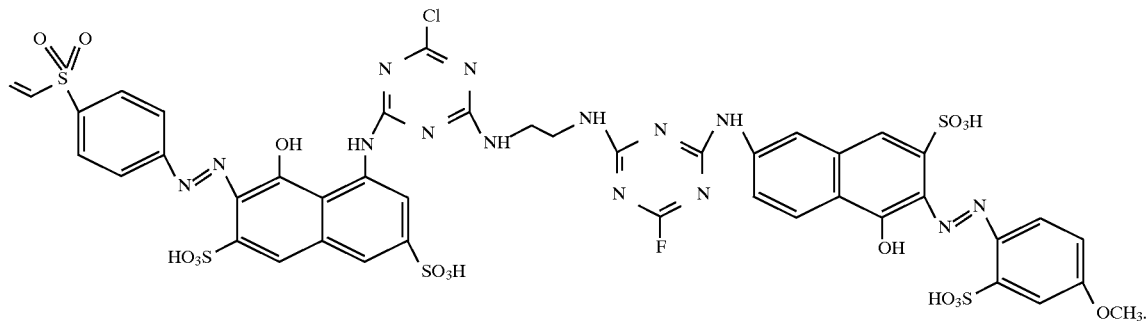

EXAMPLE 8b

The procedure described in Example 8 is followed, except that 80 parts of the compound of the formula (12b) are used instead of 80 parts of the compound of the formula (12), affording the dye of the formula

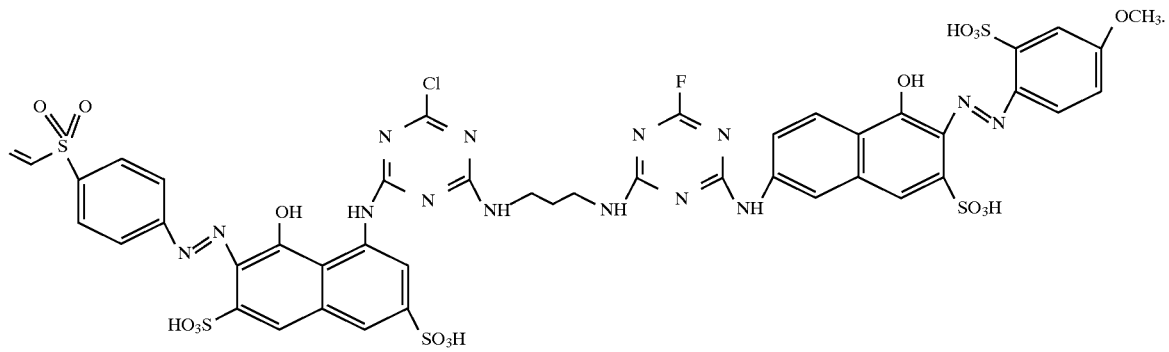

EXAMPLE 8c

The procedure described in Example 8 is followed, except that 84 parts of the compound of the formula (12c) are used instead of 80 parts of the compound of the formula (12), affording the dye of the formula

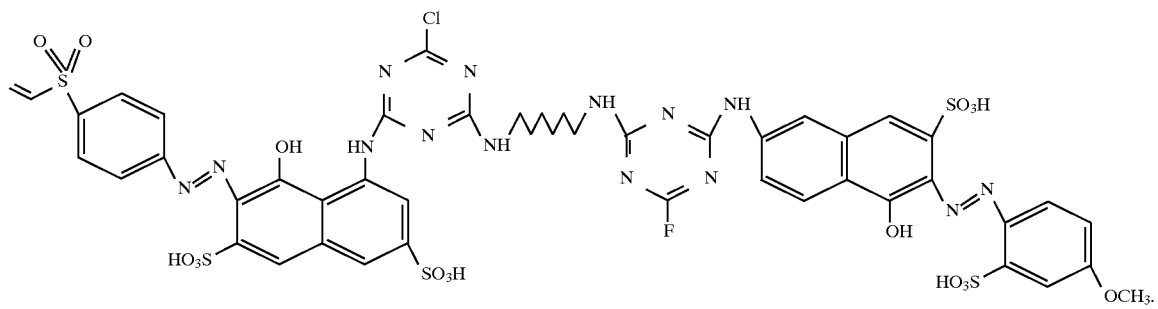

EXAMPLE 9

50 parts of 7-amino-4-hydroxy-3-(4-methoxy-2-sulfophenylazo)naphthalene-2-sulfonic acid are suspended with 5 parts of disodium hydrogen phosphate in 750 parts of water, 16 parts of cyanuric fluoride are added dropwise at a temperature of 0° to 2° C. and the pH is kept at 6 with the aid of aqueous sodium hydroxide solution. Thereafter, 7.5 parts of 1,2-diaminopropane, dissolved in 100 parts of water such that the pH does not exceed 8.5, are added and the mixture is allowed to warm to room temperature. The pH is kept at 8 with sodium hydroxide solution for the duration of the reaction. Finally, the reaction mixture prepared according to Example 3, which comprises the compound of the formula (3), is added and the mixture is heated to 25° to 30° C. and stirred at pH 8.5 for two hours and at pH 11 for 20 minutes. The reaction mixture is neutralized with dilute hydrochloric acid, largely desalinated by reverse osmosis and evaporated to dryness in vacuo. The dye of the formula

EXAMPLE 10

The procedure described in Example 9 is followed, except that an equivalent amount of 3-(5-amino-2-sulfophenylazo)-5-benzoylamino-4-hydroxynaphthalene-2,7-disulfonic acid is used instead of 7-amino-4-hydroxy-3-(4-methoxy-2-sulfophenylazo)-naphthalene-2-sulfonic acid, affording the dye of the formula

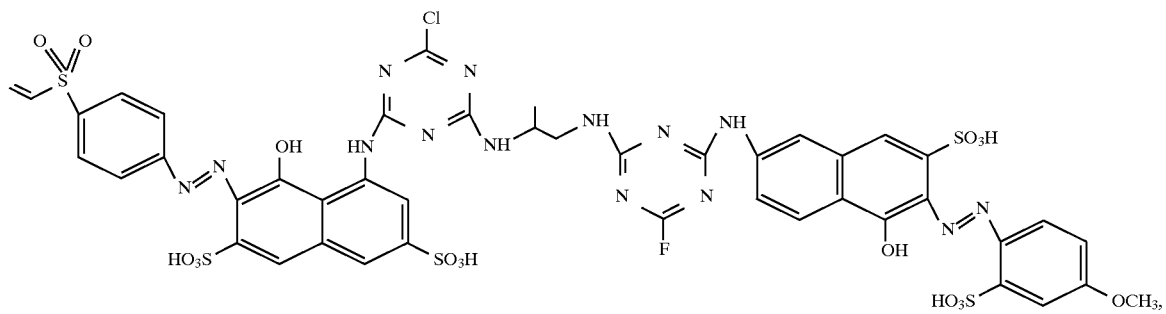

which dyes cellulose in brilliant red shades with good all-round properties, is obtained.

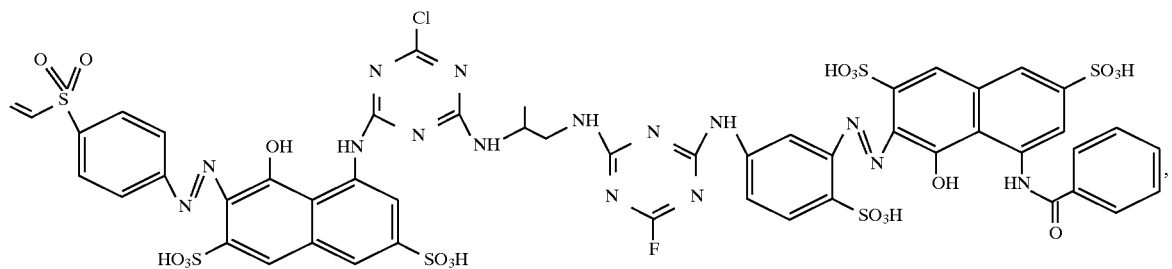

which dyes cellulose in red shades with good all-round properties.

EXAMPLES 11 to 18

The following compound, each of which dyes cotton with good all-round properties, can be prepared in a manner analogous to that described in Examples 5 and 9.

11 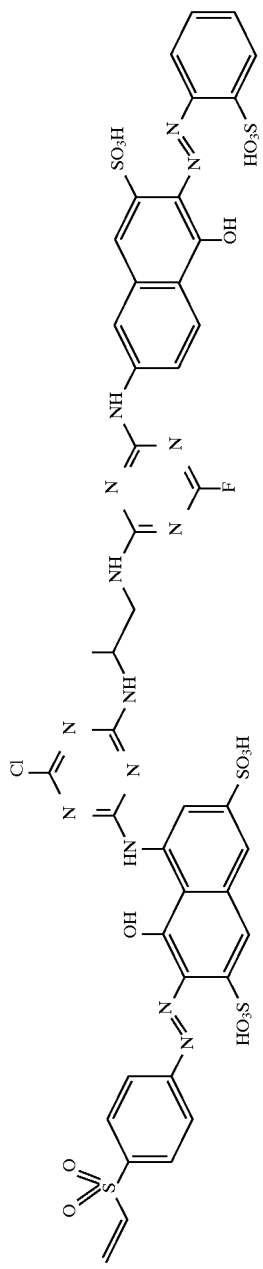 12 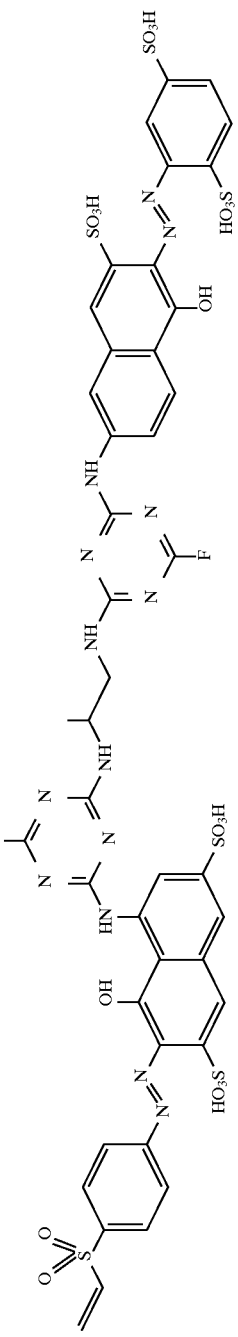 13 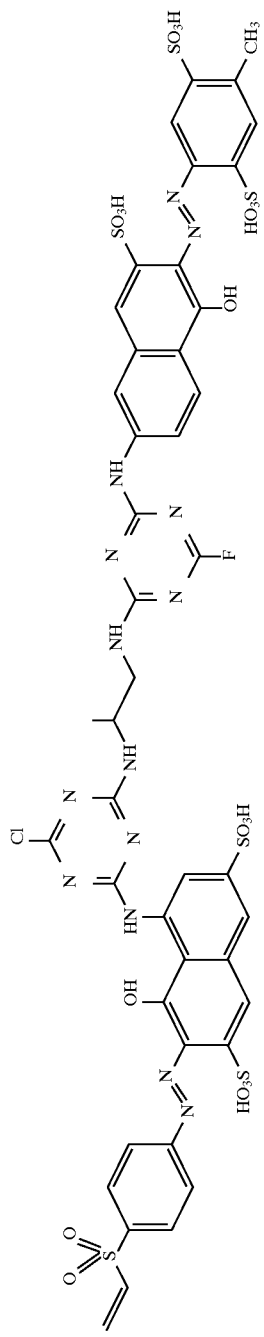 14 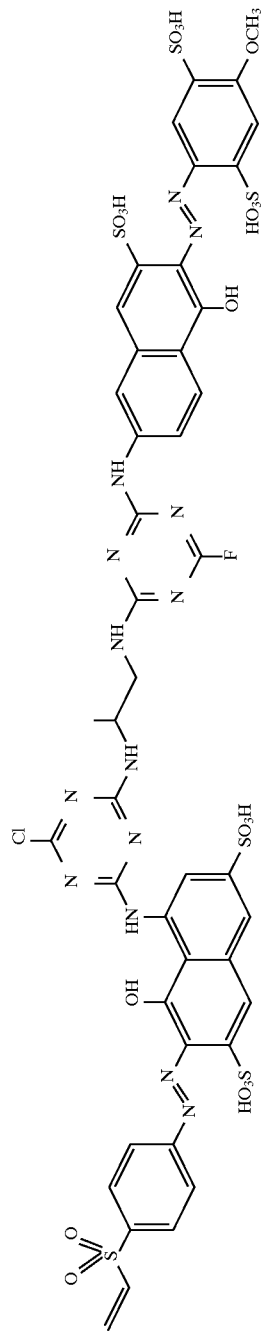

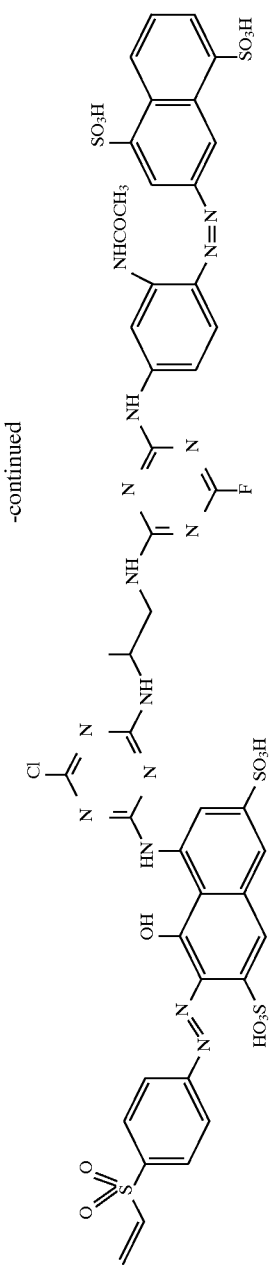
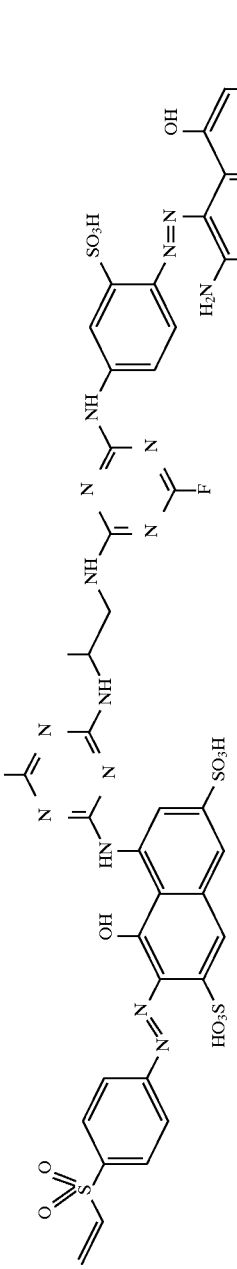
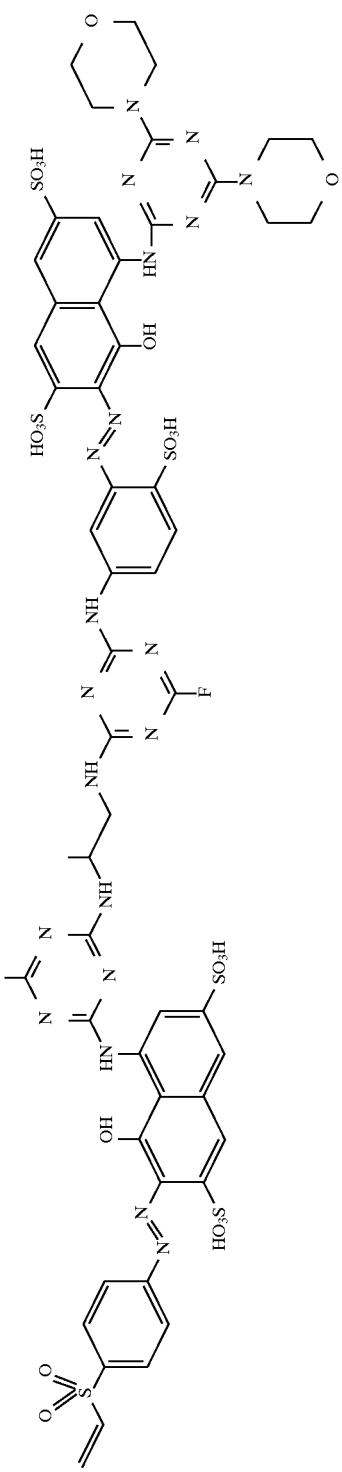

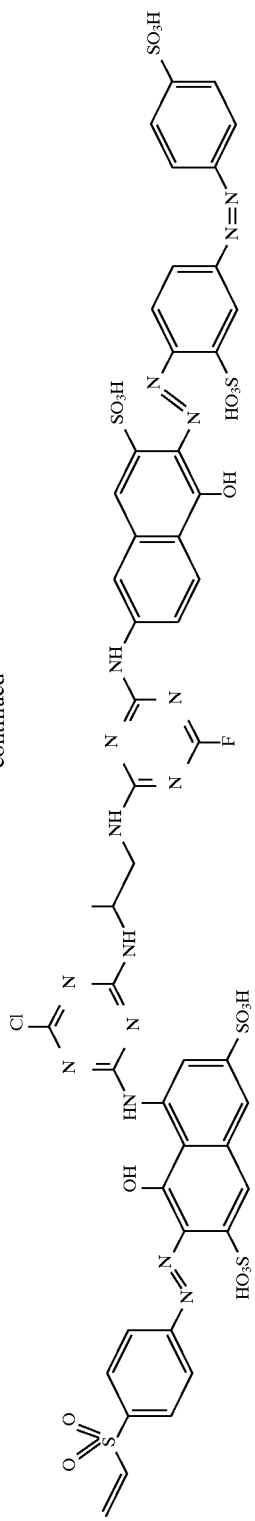

Dyeing instructions I 2 parts of the dye, obtained according to Example 5 are dissolved in 400 parts of water; 1500 parts of a solution which comprises 53 g of sodium chloride per liter are added. 100 parts of cotton fabric are introduced into this dyebath at 40° C. After 45 minutes, 100 parts of a solution which comprises 16 g of sodium hydroxide and 20 g of calcined sodium carbonate per liter are added. The temperature of the dyebath is kept at 40° C. for a further 45 minutes. Thereafter, the dyed goods are rinsed, soaped at the boil for a quarter of an hour with a nonionic detergent, rinsed again and dried.

Dyeing instructions II 2 parts of the reactive dye obtained according to Example 9 are dissolved in 400 parts of water; 1500 parts of a solution which comrises 53 g of sodium chloride per liter are added. 100 parts of a cotton fabric are introduced into this dyebath at 35° C.

After 20 minutes, 100 parts of a solution which comprises 16 g of sodium hydroxide and 20 g of calcined sodium carbonate per liter are added. The temperature of the dyebath is kept at 35° C. for a further 15 minutes. Thereafter, the temperature is increased to 60° C. in the course of 20 minutes. The temperature is kept at 60° C. for a further 35 minutes. The goods are then rinsed, soaped at the boil for a quarter of an hour with a nonionic detergent, rinsed again and dried.

Dyeing instructions III 8 parts of the reactive dye obtained according to Example 9 are dissolved in 400 parts of water; 1400 parts of a solution which comprises 100 g of sodium sulfate per liter are added. 100 parts of a cotton fabric are introduced into this dyebath at 25° C. After 10 minutes, 200 parts of a solution which comprises 150 g of trisodium phosphate per liter are added. Thereafter, the temperature of the dyebath is increased to 60° C. in the course of 10 minutes. The temperature is kept at 60° C. for a further 90 minutes. The goods are then rinsed, soaped at the boil for a quarter of an hour with a nonionic detergent, rinsed again and dried.

Dyeing instructions IV 4 parts of the reactive dye obtained according to Example 5 are dissolved in 50 parts of water. 50 parts of a solution which comprises 5 g of sodium hydroxide and 20 g of calcined sodium carbonate per liter are added. A cotton fabric is padded with the resulting solution such that it increases by 70% of its weight, and is then wound onto a beam. The cotton fabric is kept at room temperature in this way for 3 hours. Thereafter, the dyed goods are rinsed, soaped at the boil for a quarter of an hour with a nonionic detergent, rinsed again and dried.

Dyeing instructions V 6 parts of the reactive dye obtained according to Example 5 are dissolved in 50 parts of water. 50 parts of a solution which comprises 16 g of sodium hydroxide and 0.04 liter of water-glass (38° Bé) per liter are added. A cotton fabric is padded with the resulting solution such that it increases by 70% of its weight, and is then wound onto a beam. The cotton fabric is kept At room temperature in this way for 10 hours. Thereafter, the dyed goods are rinsed, soaped at the boil for a quarter of an hour with a nonionic detergent, rinsed again and dried.

Dyeing instructions VI 2 parts of the reactive dye obtained according to Example 9 are dissolved in 100 parts of water with the addition of 0.5 part of sodium m-nitrobenzenesulfonate. A cotton fabric is impregnated with the resulting solution such that it increases by 75% of its weight, and is then dried. The fabric is then impregnated with a solution, warmed to 20° C., which comprises 4 g of sodium hydroxide and 300 g of sodium chloride per liter and squeezed off to a weight increase of 75%, and the dyeing is then steamed at 100 to 102° C. for 30 seconds, soaped for a quarter of an hour in a 0.3% boiling solution of a nonionic detergent, rinsed and dried.

Dyeing instructions VII 0.1 part of the dye according to Example 5 is dissolved in 200 parts of demineralized water, and 0.5 part of Gauber's salt, 0.1 part of a levelling agent and 0.5 part of sodium acetate are added. The mixture is then brought to pH 5.5 with 80% acetic acid. The dyebath is heated at 50° C. for 10 minutes, and 10 parts of a woollen fabric are then added. The bath is heated to 100° C. in the course of about 50 minutes and dyeing is carried out at this temperature for 60 minutes. Thereafter, the bath is allowed to cool to 90° C. and the dyed goods are removed. The woollen fabric is rinsed with hot and cold water, subsequently spun and dried. A brilliant dyeing which has very good light and wet fastness properties is obtained.

Printing instructions I 3 parts of the reactive dye obtained according to Example 6 are sprinkled, with rapid stirring, into 100 parts of a stock thickener comprising 50 parts of 5% sodium alginate thickener, 27.8 parts of water, 20 parts of urea, 1 part of sodium m-nitrobenzenesulfonate and 1.2 parts of sodium bicarbonate. A cotton fabric is printed with the resulting printing paste and dried and the printed material obtained is steamed in saturated steam at 102° C. for 2 minutes. The printed fabric is then rinsed, if appropriate soaped at the boil and rinsed again, and then dried.

Printing instructions II 5 parts of the reactive dye obtained according to Example 6 are sprinkled, with rapid stirring, into 100 parts of a stock thickener comprising 50 parts of 5% sodium alginate thickener, 36.5 parts of water, 10 parts of urea, 1 part of sodium m-nitrobenzenesulfonate and 2.5 parts of sodium bicarbonate. A cotton fabric is printed with the printing paste thus obtained, the stability of which meets industrial requirements, and dried and the resulting printed material is steamed in saturated steam at 102° C. for 8 minutes. The printed fabric is then rinsed, if appropriate soaped at the boil and rinsed again, and then dried.

What is claimed is:

1. A compound of the formula

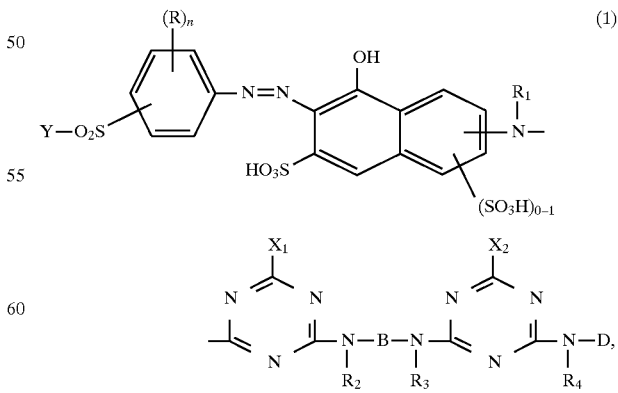

in which B is 1,2-propylene, 1,3-propylene, 2-hydroxy-1,3-propylene, 1,4-butylene, 2-methyl-1,5-pentylene or 1,6-hexylene, D is the radical of a monoazo, polyazo, metal complex azo, anthraquinone, phthalocyanine, formazan or dioxazine chromophore, (R)$_n$ is n identical or different radicals from the group consisting of C$_1$–C$_4$alkyl, C$_1$–C$_4$alkoxy, halogen and sulfo, n is the number 0, 1 or 2, R$_1$, R$_2$, R$_3$ and R$_4$ independently of one another are each hydrogen or substituted or unsubstituted C$_1$–C$_4$alkyl, one of the radicals X$_1$ and X$_2$ is chlorine and the other is fluorine, Y is vinyl or a radical —CH$_2$—CH$_2$—U and U is a leaving group.

2. A compound according to claim 1, in which

R$_1$, R$_2$, R$_3$ and R$_4$ independently of one another are each hydrogen or C$_1$–C$_4$alkyl.

3. A compound according to claim 1, in which

X$_1$ is chlorine and

X$_2$ is fluorine.

4. A compound according to claim 1, in which B is 1,2-propylene.

5. A compound according to claim 1, in which (R)$_n$ is 0 or 1 radical from the group consisting of methyl, methoxy, chlorine and sulfo and Y is vinyl, β-chloroethyl, β-sulfatoethyl, β-thiosulfatoethyl, β-acetoxyethyl, β-phenoxyethyl or β-phosphatoethyl.

6. A compound according to claim 1, in which

D is a radical of the formula

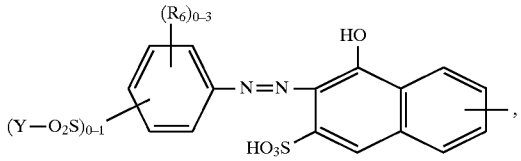
(2a)

in which (R$_6$)$_{0-3}$ is 0 to 3 identical or different substituents from the group consisting of C$_1$–C$_4$alkyl, C1–C$_4$alkoxy, halogen, carboxyl and sulfo and Y is vinyl, β-chloroethyl, β-sulfatoethyl, β-thiosulfatoethyl, β-acetoxyethyl, β-phenoxyethyl or β-phosphatoethyl;

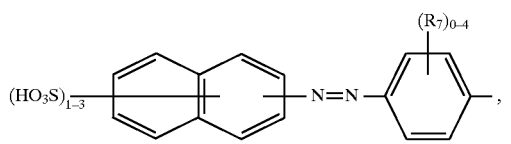
(2e)

in which (R$_7$)$_{0-4}$ is 0 to 4 identical or different substituents from the group consisting of halogen, nitro, cyano, trifluoromethyl, sulfamoyl, carbamoyl, C$_1$–C$_4$alkyl, C$_1$–C$_4$alkoxy, amino, acetylamino, ureido, hydroxyl, carboxyl, sulfomethyl and sulfo;

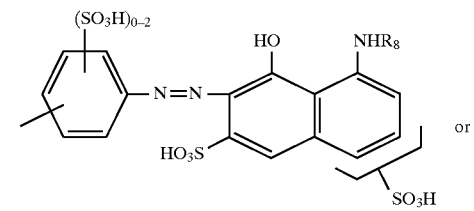
(2h)

or

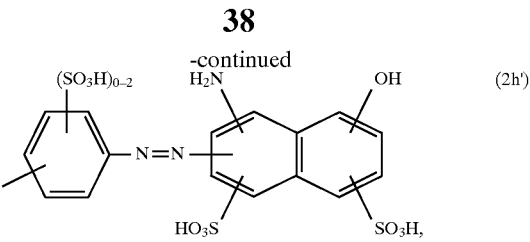
(2h')

in which R$_8$ is C$_1$–C$_4$alkanoyl, benzoyl or a non-reactive triazinyl radical of the formula

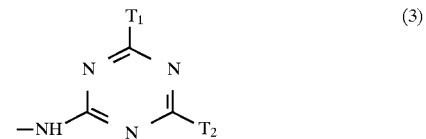
(3)

and T$_1$ and T$_2$ independently of one another are each hydroxyl, C$_1$–C$_4$alkoxy, C$_1$–C$_4$alkylthio, morpholino or amino which is unsubstituted or substituted by non-reactive radicals;

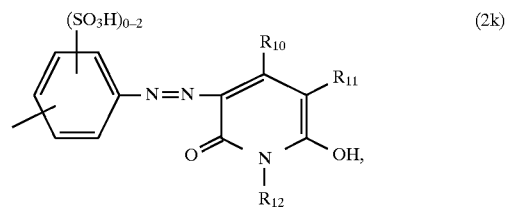
(2k)

in which R$_{10}$ and R$_{12}$ independently of one another are hydrogen, C$_1$–C$_4$alkyl or phenyl and R$_{11}$ is hydrogen, cyano, carbamoyl or sulfomethyl;

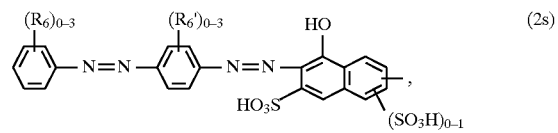
(2s)

in which (R$_6$')$_{0-3}$ is 0 to 3 identical or different substituents from the group consisting of C$_1$–C$_4$alkyl, C$_1$–C$_4$alkoxy which is unsubstituted or substituted by hydroxyl, sulfato or C$_1$–C$_2$alkoxy, halogen, carboxyl or sulfo and (R$_6$)$_{0-3}$ is as defined above; or

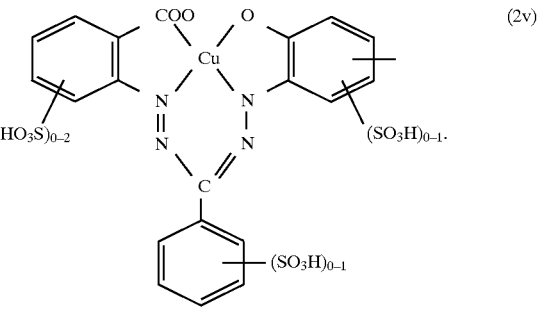
(2v)

7. A compound according to claim 6, of the formula

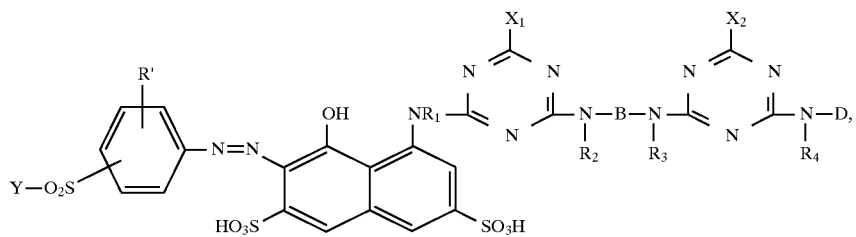

(1a)

in which R' is hydrogen, methyl, methoxy, chlorine or sulfo,

Y is vinyl or β-sulfatoethyl, $R_1$, $R_2$, $R_3$ and $R_4$ independently of one another are each hydrogen or $C_1$–$C_4$alkyl, one of the radicals $X_1$ and $X_2$ is chlorine and the other is fluorine, B is 1,2-propylene, 1,3-propylene, 1,4-butylene, 2-methyl-1,5-pentylene or 1,6-hexylene and D is a radical of the formula (2a), (2e), (2h), (2h'), (2k), (2s) or (2v) defined in claim 6.

8. A compound according to claim 7 of the formula (1a), in which

R' is hydrogen or sulfo,

Y is vinyl or β-sulfatoethyl, $R_1$, $R_2$, $R_3$ and $R_4$ are each hydrogen, $X_1$ is chlorine and $X_2$ is fluorine, B is 1,2-propylene, 1 3-propylene, 1,4-butylene 2-methyl-1,5-pentylene or 1,6-hexylene and D is a radical of the formula

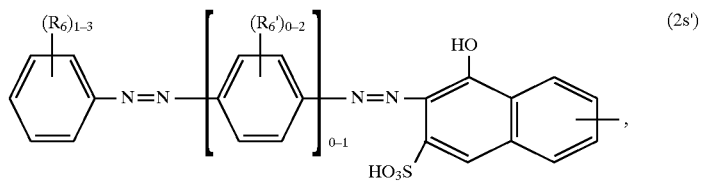

(2s')

(2e')

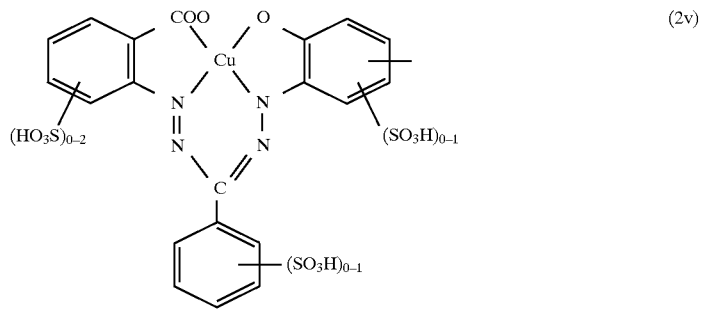

(2v)

in which $(R_6)_{1-3}$ is 1 to 3 identical or different radicals from the group consisting of methyl, methoxy and sulfo, $(R_6')_{0-2}$ is 0 to 2 identical or different radicals from the group consisting of sulfo, methyl and methoxy, $R_7$ is methyl, methoxy, acetylamino, ureido or sulfo and K is a 1- or 2-naphthyl radical which is substituted by sulfo, amino, hydroxyl, benzoylamino or by a radical of the formula

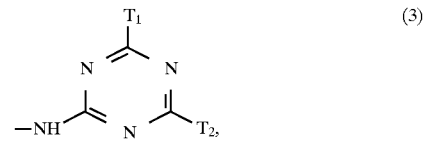

(3)

in which $T_1$ and $T_2$ independently of one another are each morpholino, amino, methylamino, ethylamino, β-hydroxyethylamino, N,N-di-β-hydroxyethylamino, β-sulfoethylamino, cyclohexylamino, o-, m- or p-methylphenylamino, o-, m- or p-methoxyphenylamino, o-, m- or p-sulfophenylamino, 2,4- or 2,5-disulfophenylamino, 2- or 3-sulfo-4-methoxyphenylamino, 2- or 3-sulfo-4-methylphenylamino, 4-methyl-2,5-disulfophenylamino, o-carboxyphenylamino, 1 - or 2-naphthylamino, 1-sulfo-2-naphthylamino, 1,5-disulfo-2-naphthylamino, 6,8-disulfo-2-naphthylamino, 4,8-disulfo-2-naphthylamino, 4,6,8-trisulfo-2-naphthylamino, 1,5,7-trisulfo-2-naphthylamino, 3,6,8-trisulfo-2-naphthylamino, 1,6-disulfo-2-naphthylamino, N-ethyl-N-phenylamino, N-methyl-N-phenylamino, N-β-sulfoethyl-N-phenylamino, or β-hydroxyethyl-N-phenylamino, or is a pyridone radical of the formula

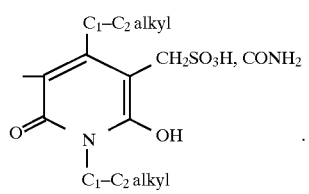

(4)

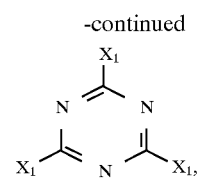

(7)

9. A compound according to claim 1, of the formula

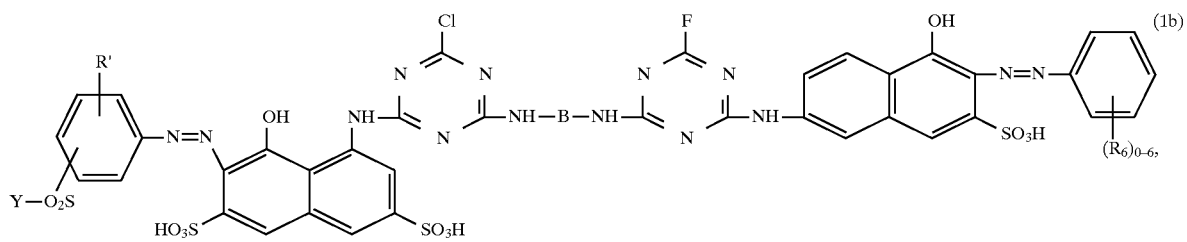

(1b)

in which R' is hydrogen, methyl, methoxy, chlorine or sulfo, $(R_6)_{0-3}$ is 0 to 3 identical or different substituents from the group consisting of $C_1$–$C_4$alkyl, $C_1$–$C_4$alkoxy, halogen, carboxyl and sulfo, Y is vinyl or β-sulfatoethyl and B is 1,2-propylene, 1,3-propylene, 1,4-butylene, 2-methyl-1,5-pentylene or 1,6-hexylene.

10. A process for the preparation of a compound of the formula (1) according to claim 1, which comprises reacting in each case about 1 molar equivalent of a compound of the formula

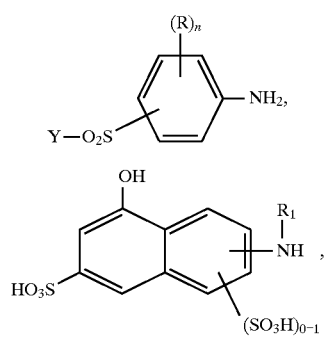

(5)

(6)

-continued $$HN-B-NH, \quad (8)$$
$$\begin{array}{cc} | & | \\ R_2 & R_3 \end{array}$$

$$\begin{array}{c} X_2 \\ \| \\ N \swarrow\!\!\!\searrow N \\ X_2 \diagdown\!\!\!\diagup N \diagdown\!\!\!\diagup X_2 \end{array} \quad \text{and} \quad (9)$$

$$\begin{array}{c} HN-D \\ | \\ R_4 \end{array} \quad (10)$$

in which B, D, $(R)_n$, $R_1$, $R_2$, $R_3$, $R_4$, $X_1$, $X_2$ and Y are each as defined in claim 1, with one another in any sequence.

11. A process for dyeing or printing fibre material containing hydroxyl groups or containing nitrogen, which process comprises the step of applying to said fibre material a tinctorially effective amount of a compound according to claim 1.

12. A process according to claim 11, wherein said fibre material is cellulosic fibre material.

* * * * *